No. 681,849. Patented Sept. 3, 1901.
E. S. GORDON.
COMBINED HARROW AND CRUSHER.
(Application filed Nov. 24, 1900.)
(No Model.)

Witnesses,

Inventor,
Edward S. Gordon
By Dewey Strong
atty

UNITED STATES PATENT OFFICE.

EDWARD S. GORDON, OF SANTA ROSA, CALIFORNIA.

COMBINED HARROW AND CRUSHER.

SPECIFICATION forming part of Letters Patent No. 681,849, dated September 3, 1901.

Application filed November 24, 1900. Serial No. 37,604. (No model.)

*To all whom it may concern:*

Be it known that I, EDWARD S. GORDON, a citizen of the United States, residing at Santa Rosa, county of Sonoma, State of California, have invented an Improvement in a Combined Harrow and Crusher; and I hereby declare the following to be a full, clear, and exact description of the same.

My invention relates to improvements in cultivating devices.

It consists in the combination of a crusher or roller and of teeth or picks operating in a generally-vertical direction upon the soil.

It consists also of details more fully to be set forth in the following specification and accompanying drawings.

Figure 1:
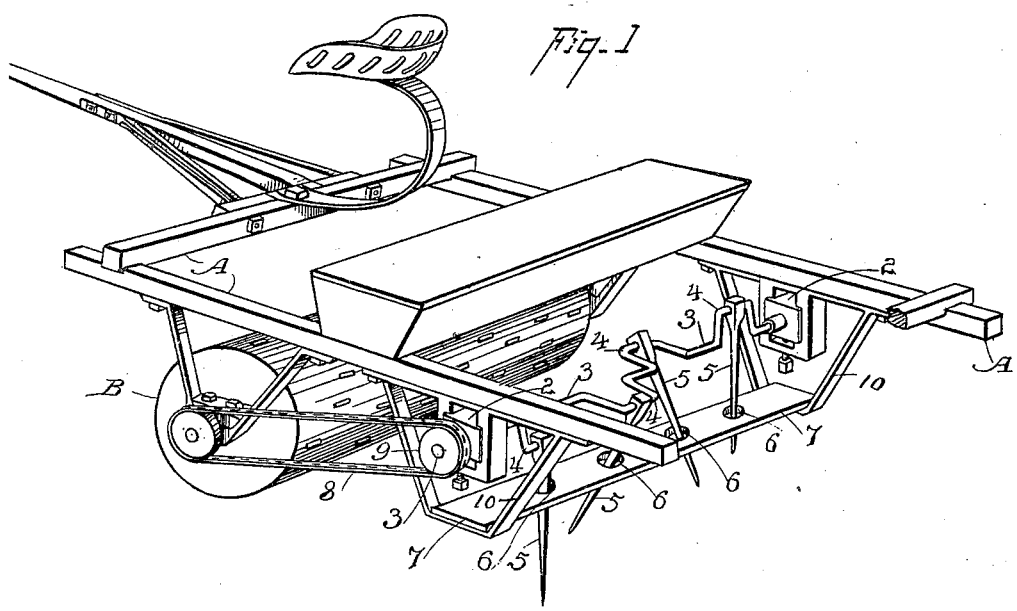
Figure 2:
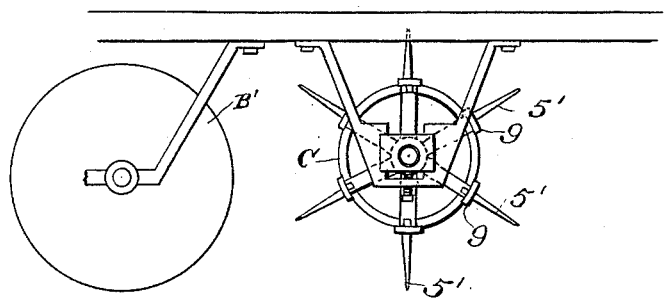

Figure 1 is a perspective view of the machine. Fig. 2 is a side elevation showing a modification.

In working certain soils, as adobe and generally those of a clayey character, it is found almost impossible to break up the clods sufficiently by means of the ordinary harrow, disk cultivator, &c. Instruments passing horizontally over the ground like the teeth of a harrow merely strike against the clods and push them aside without pulverizing them to any proper degree. Where they are broken by a roller, as it is not always advisable or practicable to do, the soil must be again loosened by separate harrowing. With soil like adobe these clods often can only be broken, particularly when they have become dry, by a direct blow, as by a pick. My invention tends to embody the application of this principle of crushing by having a series of vertically-actuating teeth or picks passing over the ground and acting not only to pierce the clods, but serving as harrow-teeth as well.

A represents a framework of any suitable shape or dimensions.

B is a roller upon which the frame is carried. Instead of a roller I may see fit to mount my device on wheels.

Rearward of the roller and supported in the adjustable journals 2 is a shaft 3, having the cranks 4 arranged in different planes in relation to each other. Turnably mounted on these cranks are the picks 5, guided through holes 6 in a cross-bar 7. This bar has its ends supported upon brackets 10, depending from the frame A directly below the crankshaft. A belt or chain 8 communicates power from the roller to the pulley 9, carried on the shaft 3, whereby the picks are given a reciprocal movement in the guides 6. Thus as the machine moves over the ground the revolution of the shaft is continually causing these picks to be lifted in and out of the ground, piercing and breaking the lumps and clods in their movement, and, furthermore, during a portion of the stroke these picks are drawn through the earth like the teeth of a harrow and perform the same function. There may be as many of these picks provided as necessary. It may at times be desired, according to the nature of the soil, to have these picks fixed upon a roller, but performing the same function that the singly-gyrating picks do. This is shown in Fig. 2.

C represents a second roller, driven as before. The picks 5' are secured to removable bars 9, which are suitably fastened to the roller C.

Having thus described my invention, what I claim as new, and desire to secure by Letters Patent, is—

1. The combination of a roller, a supporting-frame, brackets depending from said frame, a cross-bar supported upon the brackets and having guides, a shaft having cranks, and picks having their upper portions attached to said cranks and their lower portions operating through the guides of the cross-bar.

2. The combination of a supporting-frame having depending brackets, a roller, a crankshaft in rear of the roller and boxes for the ends of said shaft, a bar having guide-openings, said bar having its ends supported upon said brackets, and picks having their upper portions attached to the cranks and their lower portions operating through and guided in the guide-openings of the bar.

In witness whereof I have hereunto set my hand.

EDWARD S. GORDON.

Witnesses:
J. H. NEYCE,
OTIS GORDON.